(12) United States Patent
Davis et al.

(10) Patent No.: US 7,784,057 B2
(45) Date of Patent: Aug. 24, 2010

(54) SINGLE-STACK MODEL FOR HIGH PERFORMANCE PARALLELISM

(75) Inventors: Mark Davis, Warrenville, IL (US); Sundeep R. Peechu, Mableton, GA (US)

(73) Assignee: Intel Corporation, Santa Clara, CA (US)

( * ) Notice: Subject to any disclaimer, the term of this patent is extended or adjusted under 35 U.S.C. 154(b) by 1516 days.

(21) Appl. No.: 10/928,362

(22) Filed: Aug. 27, 2004

(65) Prior Publication Data

US 2005/0050542 A1   Mar. 3, 2005

Related U.S. Application Data

(60) Provisional application No. 60/498,220, filed on Aug. 27, 2003.

(51) Int. Cl.
G06F 9/46 (2006.01)
G06F 9/40 (2006.01)
G06F 9/44 (2006.01)
G06F 12/06 (2006.01)
G06F 12/00 (2006.01)

(52) U.S. Cl. ............... 718/108; 718/100; 712/202; 712/228; 711/5; 711/100; 711/147

(58) Field of Classification Search .......... 718/1, 718/100, 102, 103, 104, 105, 107, 108; 712/202, 712/228, 233, 200, 224; 711/1, 5, 100, 147
See application file for complete search history.

(56) References Cited

U.S. PATENT DOCUMENTS

| 5,276,879 | A  | * | 1/1994  | Barry et al.      | 718/106 |
| 5,794,047 | A  | * | 8/1998  | Meier             | 717/133 |
| 5,828,881 | A  | * | 10/1998 | Wang              | 719/314 |
| 6,035,321 | A  | * | 3/2000  | Mays              | 718/103 |
| 6,070,010 | A  | * | 5/2000  | Keenleyside et al.| 717/154 |
| 6,418,460 | B1 | * | 7/2002  | Bitar et al.      | 718/108 |
| 6,507,903 | B1 | * | 1/2003  | Beatty et al.     | 711/173 |
| 6,823,517 | B1 | * | 11/2004 | Kalman            | 718/108 |
| 6,826,675 | B1 | * | 11/2004 | Tormey et al.     | 712/202 |
| 6,857,120 | B1 | * | 2/2005  | Arnold et al.     | 717/157 |
| 6,941,377 | B1 | * | 9/2005  | Diamant et al.    | 709/230 |
| 6,988,264 | B2 | * | 1/2006  | Sarma et al.      | 717/128 |
| 7,225,443 | B2 | * | 5/2007  | Lake              | 718/100 |
| 7,373,646 | B1 | * | 5/2008  | Smith             | 718/108 |
| 7,401,335 | B2 | * | 7/2008  | Pizzi et al.      | 718/104 |
| 2002/0046230 | A1 | * | 4/2002 | Dieterich et al. | 709/107 |

(Continued)

OTHER PUBLICATIONS

T.P. Baker; Stack-Based Scheduling of Realtime Processes; The Journal of Real-Time Systems, 3, 67-99 (1991).*

Robert Davis, Nick Merriam, Nigel Tracey; How embedded applications using an rtos can stay within on-chip memory limits; Scientific Commons 2000; 8 pages.*

*Primary Examiner*—Meng-Ai An
*Assistant Examiner*—Abdullah Al Kawsar
(74) *Attorney, Agent, or Firm*—Schwabe, Williamson & Wyatt, P.C.

(57) ABSTRACT

A method and apparatus are provided for operating a processor. The method comprising the steps of providing a single call stack for execution of a plurality of tasks that operate on the processor, parallelly operating the plurality of tasks and allowing a context switch from a first task to a second task of the plurality of tasks, but only when operation of the first task is blocked.

13 Claims, 5 Drawing Sheets

Sample Single Stack Processing System

U.S. PATENT DOCUMENTS

2002/0072830 A1* 6/2002 Hunt .............................. 701/1

2004/0205752 A1* 10/2004 Chou et al. .................. 718/100

* cited by examiner

FIG. 1. On-Demand Context

FIG. 2. Call Stack Layout (First Pass)

FIG. 3. Call Stack Layout (Second Pass)

FIG. 4. Call Stack Alignment & Splicing

FIG. 5. Sample Single Stack Processing System ately essential for better throughput but even
SINGLE-STACK MODEL FOR HIGH PERFORMANCE PARALLELISM This application is a continuation of Provisional Application No. 60/498,220 filed Aug. 27, 2003.

FIELD OF THE INVENTION

The field of the invention relates to computer systems and more particularly to methods of allowing multi-tasking on computers.

BACKGROUND OF THE INVENTION

This invention relates to computer systems and particularly to methods for providing high performance multi-tasking on servers. More particularly, the invention relates to an efficient way to handle multiple work units in servers while providing high throughput and low response times. Typical high performance servers need to process many jobs in parallel with the least possible overhead. On multi-processor machines, multi-tasking is obviously essential for better throughput but even on a single processor, it ensures that the response times for short tasks is not affected by the longer ones.

There are several approaches to achieving multi-tasking in prevailing systems. Using multiple processes is the easiest approach provided by most operating systems. The upsides are ease of programming and maintenance. The downside is that this approach tends to suffer from increasing cache degradation as the number of processes increases. Further, context switching by the kernel is expensive and less efficient with an increasing number of processes since scheduling is pre-emptive. If one maintains a low number of processes, then blocking events reduce the utilization.

Using multiple threads is another common approach with support from both kernel and user space. Kernel threads suffer from similar drawbacks as the process approach. User-space threads have better performance especially for pre-forked threads but synchronization is an issue due to the preemptive nature of the scheduler. Also, when multiple threads accept connections on the same socket, they are waitlisted on the same queue. When a new connection is made, all threads on the socket's wait queue are awakened. All but one of the threads, however, will put themselves back on the queue to wait for the next connection. This unnecessary awakening, commonly referred to as a thundering herd problem, creates scalability problems for server applications.

Co-routines provide another solution similar to user threads with non-preemption. However co-routine creation is expensive especially when only portable mechanisms are used.

Further, in each of the above approaches, there is a fixed cost due to switching between call stacks, which limits the performance even in cases when tasks can be run to completion.

Many of the aforementioned issues can be resolved by using a single threaded state-machine model but there is considerable programming complexity required in this approach due to maintaining state information for each request. Also it might not always be viable especially in the case when third party libraries are used. It is thus apparent that there is a need in the art for a portable, lower overhead solution that provides high-performance parallelism in event driven asynchronous servers.

SUMMARY OF THE INVENTION

According to the current invention, methods and apparatus are provided by which high-performance parallelism can be achieved in a portable way in computer systems using only a single stack. The techniques described herein employ a capability present in most operating systems to save current register context and to perform a context switch in which this register context can be restored. This register context differs from one architecture to another but almost always consists of the instruction pointer, stack pointer besides other general purpose registers. The objectives of illustrated embodiments of the present invention may be provided by the system described below that provides one or more of the following functional attributes:

To create/switch/delete tasks only when necessary through the use of on-demand contexts.

To provide a system which multiplexes between tasks using a single call stack to avoid unnecessary context switches.

To provide a system which has a low overhead for saving, restoring and switching context.

To provide such a system without modifying the host computer operating system.

To provide a system that is portable across several host computer architectures.

To provide a system that is highly portable across several programming languages.

To provide a system that is implemented without critical sections of software.

To provide a system in which there can be multiple instances of supervisor/worker tasks.

To provide a system wherein requests are not preempted while running and each is allowed to run until it has to wait for a resource or asynchronous operation on the host computer.

To provide such a system wherein there is no overhead when a task need not have to wait for a resource or asynchronous operation on the host computer.

To provide a system where there is minimum overhead to port existing single task software to run as multiple tasks.

To provide a system that can be used by numerous applications, which have parallel requests, that need to be executed in a high-performance non-blocking fashion.

The above and other objectives can be achieved in a system implementing non-preemptible multi-tasking using a Single-Stack On-demand Switching (S-SOS) model of execution.

The system architecture comprises of a supervisor and several worker tasks (programs or applications). The application is event-driven with the scheduling implemented by the supervisor event loop. It listens for incoming events and does work or triggers a worker task based on the type of event. The scheduling is non-preemptive so the supervisor can run till it needs to wait on a resource to become available or for an asynchronous operation to be completed.

At this point, according to an embodiment of the present invention, it creates a worker task and switches back to the supervisor after creating and saving an on-demand context. When the resource becomes available or the asynchronous operation is completed, a notification is sent to the supervisor which triggers the corresponding worker task after restoring the previously saved on-demand context while reusing the existing call stack according to another embodiment. In this fashion, a large number of tasks can be run in parallel while delivering high throughput and response times to the application.

These tasks run in parallel but not concurrently since all of them execute in a single-stack and hence a single kernel thread. However, other complementary multi-tasking methods may be used in conjunction with the present invention to achieve concurrency. A benefit from using this approach is that the code need only be thread-safe and need not be re-entrant safe. Further, since tasks never interrupt each other, there is no competition for resources and the application can choose to run as long as it needs to provide optimum throughput and response time. The advantage of a single-stack execution model, under an illustrated embodiment of the present invention, is that each asynchronous operation needs only two context switches. Under another embodiment, the on-demand switching model, provides the advantage that non-blocking calls need no overhead.

A further understanding of the nature and the advantages of the present invention may be realized by reference to the remaining portions of the specification and the drawings.

DESCRIPTION OF SPECIFIC EMBODIMENTS

Figure 1:
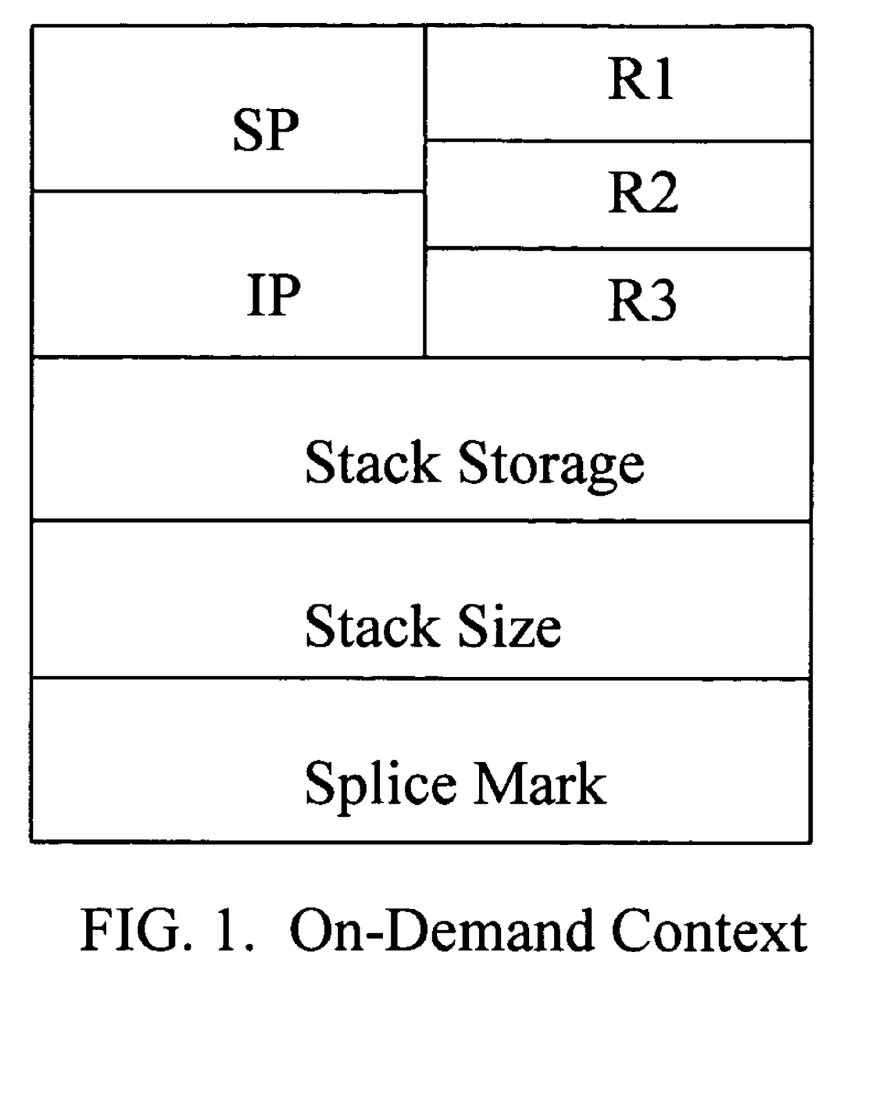
FIG. 1 is a diagram of the on-demand context according to a illustrated embodiment of the invention.
Figure 5:
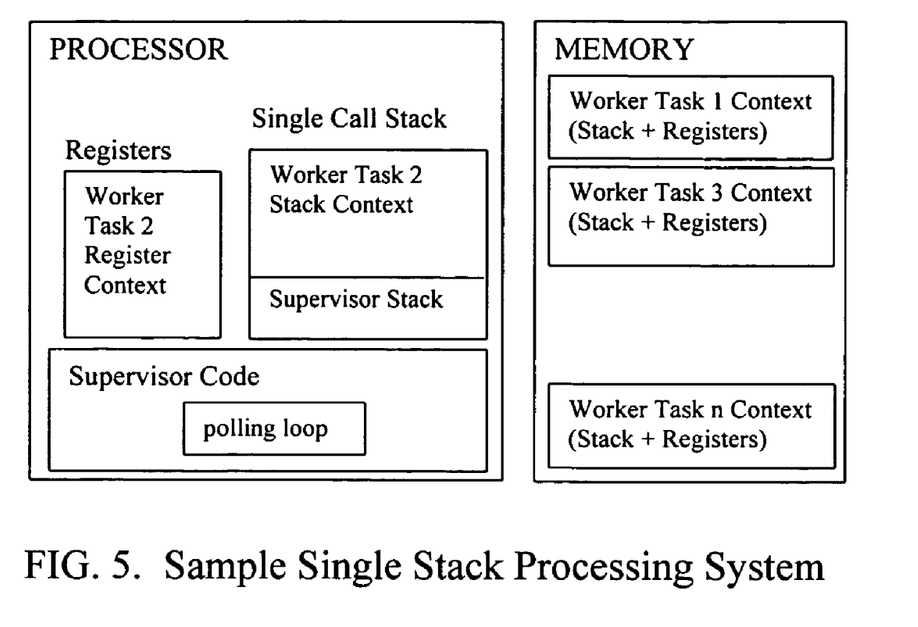
FIG. 5 is a block diagram of a processing system that may use the concepts of FIGS. 1-4 in accordance with an illustrated embodiment of the invention.

FIG. 1 shows the principal constituents of an on-demand context namely the register context and the stack context of the processing system of FIG. 5. Register context is machine dependent and most operating systems provide a mechanism to save this context into user specified memory. It consists of the Instruction Pointer(IP), the Stack Pointer(SP) and several general purpose registers(R1-R3). The stack context is the portion of the stack specific to the task that is saved again into user specified memory. It consists of the storage for the saved stack, the size of the stack, and a splice mark pointing to the address where the saved stack needs to be restored. Context creation can be optimized by using user defined memory pools, according to a specific embodiment.

Context deletion is simply a matter of releasing the memory used by the context. In the optimized case, it would amount to releasing it back to the memory pool according to another embodiment of the present invention.

Figure 2:
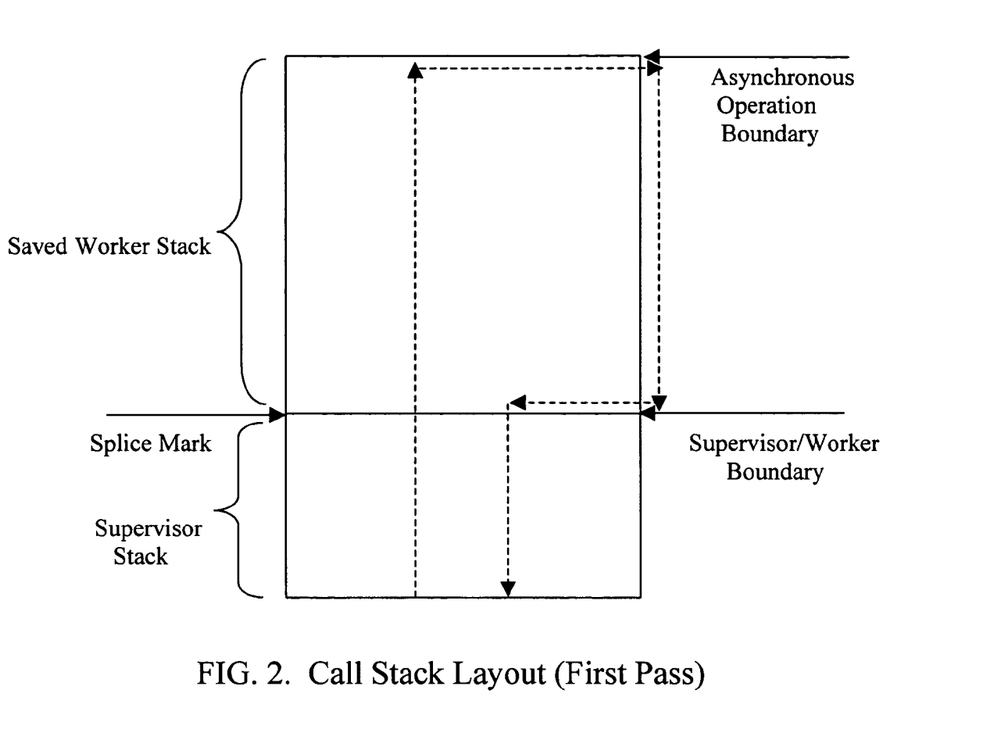
FIG. 2 is a diagram of the layout of the call stack and the control flow before and after an asynchronous operation is encountered according to a illustrated embodiment of the invention.

Each asynchronous request is completed in two passes with one context switch per pass. In the first pass, the context switch happens at the boundary of the asynchronous operation. An illustration is provided in FIG. 2 with the call stack assumed to extend upwards. At this point, the newly created worker task needs to switch back to the supervisor so that the processor is not idle waiting for the operation to complete. This context switch back to the supervisor needs no stack context since the supervisor's stack is already unwound at the tail end of the current execution stack, as shown in FIG. 2. Hence only the register context is restored with the context saved at the beginning of the blocking call. This register context need be saved just once for each supervisor/worker-group/blocking-call combination at the supervisor/worker boundary as another optimization specified in another embodiment. The dashed line in FIG. 2 shows the flow of control in this pass. Control is transferred from the boundary of the asynchronous operation down to the supervisor/worker boundary through a long jump so that the supervisor can continue with other requests.

Figure 3:
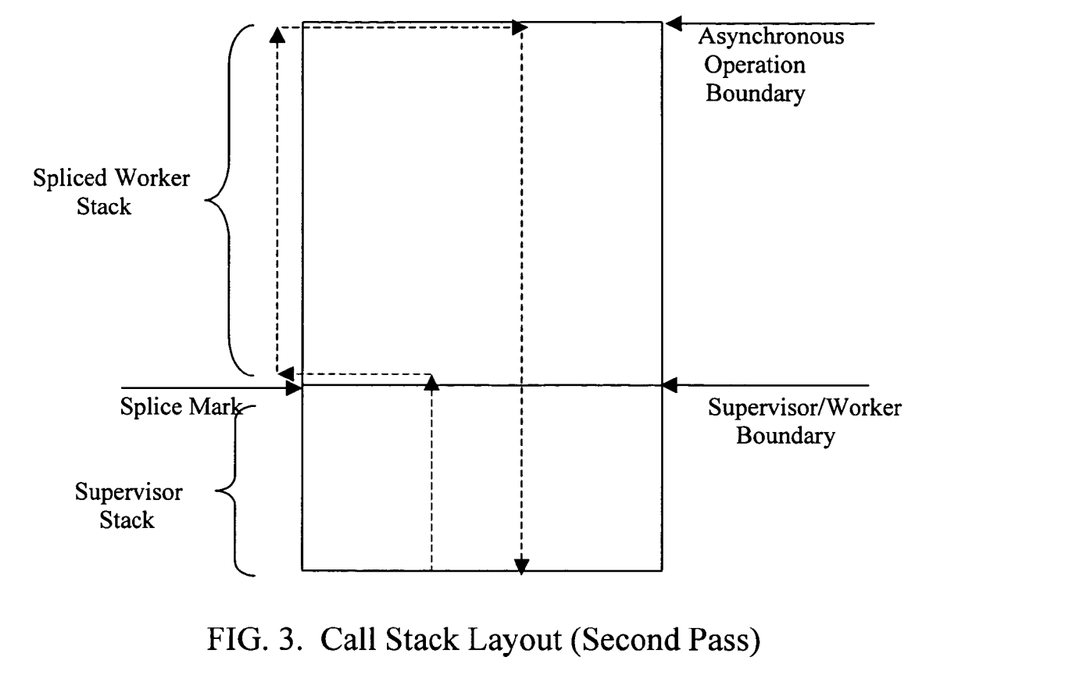
FIG. 3 is a diagram of the layout of the stack and the control flow before and after the stack is spliced according to a specific embodiment of the invention.

When the supervisor event loop receives a notification that the asynchronous operation has been completed, a second pass is made. At this point, the supervisor determines the worker task associated with this operation and switches context to it. This context switch needs both the register context and the stack context. FIG. 3 depicts the state of the stack during the second pass. The dashed line shows the flow of control in the second pass. The stack is spliced with the previously saved stack context at the boundary of the second invocation to the blocking routine. Now, control is transferred using a single long jump to the boundary of the asynchronous operation.

At this point, the worker task completes the rest of the operation and naturally falls back to the supervisor event loop once the blocking call completes since they have the same call stack. Context creation, switching and deletion are inexpensive since they are done in user-space and do not involve a trap into the kernel.

The advantage of a single-stack execution model is that each blocking call needs only two context switches. One switch occurs from the worker task to the supervisor and one back to the worker task when the asynchronous operation is complete. This is as compared to other approaches, which need at least two switches per pass amounting to four context switches for a blocking call. For example in the thread model, there is one context switch to the worker thread when the work is offloaded. There is another context switch when the worker thread is blocked. There is a third switch back to the worker thread when the asynchronous operation is complete. The fourth and final context switch occurs when the thread is finished.

The advantage of an on-demand switching model is that non-blocking calls have no overhead. Since a context is created dynamically only when a blocking operation is encountered, there is no context creation, deletion or context switching if the supervisor can run to completion. In other models, there are at least two context switches even for a non-blocking call. For example, in the thread model, there is one context switch to the worker thread when the thread is spawned and another when the thread is finished. In other approaches like co-routines, there is an additional context switch for context deletion.

There is a subtle complexity with saving and restoring stack context as described previously. The saved call stack has pointers to absolute addresses, which need to be preserved when the execution returns to the boundary of the asynchronous operation. For example, if foobar is an activation record allocated on the stack pointing to 0x90000000, when the control transfers back into the routine foobar, the location on the stack at the location 0x90000000 needs to contain the correct activation frame for foobar. Since all frame pointers are accessed by their absolute addresses, the stack should be spliced at the exact previous address.

This is not an issue in the case when the call stack in the second pass is exactly aligned with that in the first pass. In such a situation, a blind copy of the saved stack is sufficient. But in most cases, the second call stack follows a different path, mainly due to the different notification mechanisms, which result in a discrepancy. The second call stack may be shorter or longer than the one in the first pass. In both cases, there is a need for an alignment of the stack, a specific embodiment of the invention, such that the aforementioned stack splicing can work correctly.

In order to align the call stacks to the same size, each blocking call can be enclosed in wrapper code. The wrapper itself consists of three routines which act as proxy routines, transparently pass on the call parameters and similarly return the returned value. The first routine, termed stackAlign( ), has one additional function. It anchors the top of the stack to a constant address. This may be achieved by a single instruction to update the stack pointer to a pre-allocated fixed address, but most operating systems usually provide an interface for dynamic stack allocation which can be used for the same purpose.

Figure 4:
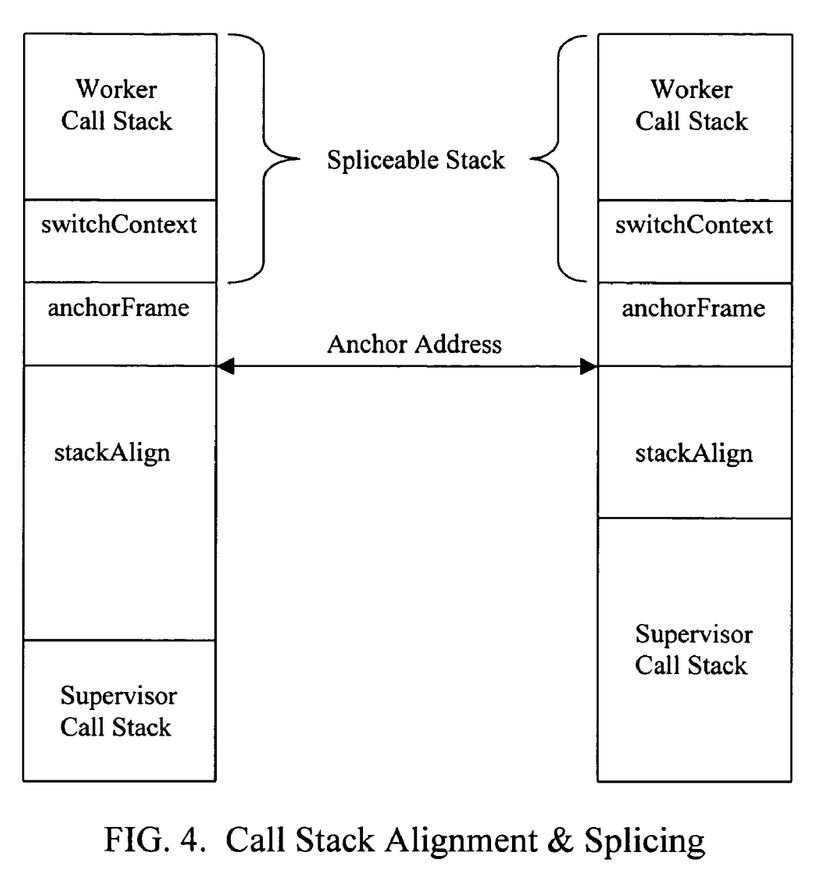
FIG. 4 is a diagram illustrating how the stack is aligned according to a illustrated embodiment of the invention.

Though the top of the stack is a constant address, the callee for stackAlign( ) still has a variable frame pointer. Thus if the callee saves and restores the call stack, it would jump to an incorrect frame. The second proxy routine, called anchorFrame( ) has no function apart from serving as a base beyond which all stack addresses are equal in the first and second pass call stacks. It always has a constant return frame and hence its callee can safely save and restore the call stack. The third proxy routine, switchcontext( ) has two functions. In the first pass, it saves the register context to which to return to when the worker task is blocked. In the second pass, it splices the stack with the on-demand saved stack, restores the saved register context and executes a long jump to the worker task. FIG. 4 depicts the stacks in the first and second pass in the case when they are unequal.

While the invention has been particularly shown and described with reference to specific embodiments thereof, it will be understood by those skilled in the art that changes to the form and details of the disclosed embodiments may be made without departing from the spirit or scope of the invention. For example, the techniques herein could equivalently apply to preemptive multi-tasking. Also, the invention has been described with reference to the stack growing upwards with increasing addresses. But it could equivalently be applied if the stack extended downward with decreasing addresses. Therefore, the scope of the invention should be determined with reference to the appended claims.

The invention claimed is:

1. A method for executing a plurality of tasks by a processor, the method comprising:
   executing a first task by the processor using a call stack, the first task having an associated first context, and the first context becoming a current context of the processor while the first task is being executed by the processor;
   detecting, by a supervisor operated by the processor, while the first task is being executed, blocking of the first task;
   allowing, by the supervisor, in response to said detecting, a context switch switching the current context of the processor from the first context to a second context associated with a second task, including saving a set of register contents and memory locations of the processor related to operation of the first task as a saved task context associated with a worker task before the context switch from the first context to the second context;
   spawning, by the supervisor, the worker task configured to subsequently complete the first task, the spawning of the worker task being triggered by the detection of the blocking of the first task;
   switching to execute the second task by the processor using the call stack;
   detecting that the first task is no longer blocked while executing the second task;
   allowing the current context to switch from the second context to the saved task context associated with the worker task when the second task has completed a predetermined set of processing steps of the second task; and
   executing the worker task by the processor using the call stack.

2. The method claim 1, further comprising activating the second task by the supervisor when blocking of the first task is detected.

3. The method of in claim 1, further comprising the supervisor allowing a context switch switching the current context from the second context to another context associated with another task during operation of the second task when the second task is blocked.

4. The method of operating the processor as in claim 1, wherein said executing the worker task further comprises aligning the call stack to a pre-allocated fixed address.

5. The method of operating the processor as in claim 1, wherein executing the worker task further comprises of adding an anchor frame to the call stack.

6. The method of operating the processor as in claim 1, wherein said executing the worker task further comprises of splicing the saved task context to the call stack.

7. An apparatus, comprising:
   a processor;
   a tangible computer-accessible memory operatively coupled to the processor;
   a supervisor configured to be executed by the processor and further operatively configured to:
   execute a first task using a call stack, wherein the first task have an associated first context and the first context becomes a current context of the processor while the first task is being executed by the processor;
   detect blocking of the first task while the first task is being executed;
   allow a context switch, switching the current context of the processor from a first context to a second context associated with a second task in response to the detection of blocking of the first task, including saving a set of register contents and memory locations of the processor related to operation of the first task as a saved task context associated with a worker task before the context switch from the first context to the second context;
   spawn the worker task configured to subsequently complete the first task, the spawning of the worker task being triggered by the detection of the blocking of the first task;
   switch to execute the second task using the call stack;
   detect that the first task is no longer blocked while executing the second task;
   allow the current context to switch from the second context to the saved task context associated with the worker task when the second task has completed a predetermined set of processing steps of the second task; and
   execute the worker task using the call stack.

8. The apparatus of claim 7, wherein the supervisor is further operatively configured to activate the second task where the supervisor detects blocking of the first task.

9. The apparatus of claim 8, wherein the supervisor is further operatively configured to allow a context switch switching the current context from the second context to another context associated with another task during operation of the second task when the second task is blocked.

10. The apparatus of claim 7, wherein the supervisor being operatively configured to execute the worker task further comprises the supervisor being operatively configured to align the call stack to a pre-allocated fixed address.

11. The apparatus of claim 7 wherein the supervisor being operatively configured to execute the worker task further comprises the supervisor being operatively configured to add an anchor frame to the call stack.

12. The apparatus of claim 7, wherein the supervisor being operatively configured to execute the worker task further comprises the supervisor being operatively configured to splice the saved task context to the call stack.

13. A processor, comprising:
   a plurality of registers; and
   execution units coupled to the registers and configured to operate a supervisor to
      execute a first task using a call stack, wherein the first task have an associated first context and the first context becomes a current context of the processor while the first task is being executed by the processor;
      detect blocking of the first task while the first task is being executed;
      allow a context switch switching the current context of the processor from the first task to a second context associated with a second task in response to the detection of blocking of the first task, including saving a set of register contents and memory locations of the processor related to operation of the first task as a saved task context associated with a worker task before the context switch from the first context to the second context;
      spawn the worker task when the supervisory task detects the blocking of the first task to subsequently complete the first task;
      switch to execute the second task using the call stack;
      detect that the first task is no longer blocked while executing the second task;
      allow the current context to switch from the second context to the saved task context associated with the worker task when the second task has completed a predetermined set of processing steps of the second task; and
      execute the worker task using the call stack.

* * * * *

UNITED STATES PATENT AND TRADEMARK OFFICE
CERTIFICATE OF CORRECTION

PATENT NO. : 7,784,057 B2
APPLICATION NO. : 10/928362
DATED : August 24, 2010
INVENTOR(S) : Davis et al.

It is certified that error appears in the above-identified patent and that said Letters Patent is hereby corrected as shown below:

Column 6, lines 12, "Method claim 1," should read --Method of claim 1,--

Column 6, line 15, "Method of in claim 1," should read --Method of claim 1,--

Signed and Sealed this

Fourteenth Day of December, 2010

David J. Kappos
*Director of the United States Patent and Trademark Office*